US006669977B2

(12) United States Patent
Loh et al.

(10) Patent No.: US 6,669,977 B2
(45) Date of Patent: Dec. 30, 2003

(54) GELATIN EXTENDER

(75) Inventors: Jimbay Peter Loh, Green Oaks, IL (US); Dreena Ann Dulin, Katonah, NY (US); Alice Shen Cha, Northbrook, IL (US)

(73) Assignee: Kraft Foods Holdings, Inc., Northfield, IL (US)

( * ) Notice: Subject to any disclaimer, the term of this patent is extended or adjusted under 35 U.S.C. 154(b) by 474 days.

(21) Appl. No.: 09/797,225

(22) Filed: Mar. 1, 2001

(65) Prior Publication Data

US 2002/0164412 A1 Nov. 7, 2002

(51) Int. Cl.⁷ .................................................. A23L 1/05
(52) U.S. Cl. ......................... 426/576; 426/573; 426/575
(58) Field of Search ................................. 426/576, 573, 426/575

(56) References Cited

U.S. PATENT DOCUMENTS

| | | | |
|---|---|---|---|
| 4,517,216 A | 5/1985 | Shim | 426/573 |
| 4,876,105 A | 10/1989 | Wolf et al. | 426/573 |
| 4,983,583 A * | 1/1991 | Ridoux | 514/54 |
| 5,196,220 A * | 3/1993 | Clare, deceased et al. | 426/329 |
| 5,348,756 A | 9/1994 | Lee et al. | 426/576 |

FOREIGN PATENT DOCUMENTS

JP    6460335    *  3/1989

OTHER PUBLICATIONS

Marrs, W.M. "Gelatin/Carbohydrate Interactions and their effect on the structure and texture of Confectionery Gels"; Prog. Fd. Nutr. Sci vol. 6, pp. 259–268. 1982.
Zasypkin, D.V. "Pressure– and heat–induced gelation of mixed β–lactoglobulin/xanthan solutions"; Food Hydrocolloids vol. 10, No. 2, pp. 203–211. 1996.
Tolstoguzov, V.B. "Some physico–chemical aspects of protein processing in foods. Multicomponent gels"; Food Hydrocolloids Vol 9 No. 4 pp. 317–332. 1995.
Tolstoguzov, V.B. et al. Die Starke 26, Nr. 4: 130–138 (Jahrg. 1974).

* cited by examiner

*Primary Examiner*—Chhaya Sayala
(74) *Attorney, Agent, or Firm*—Thomas A. Marcoux; Debbie K. Wright

(57) ABSTRACT

The present invention is directed to a setting system for use in the making of gelatin desserts comprising gelatin and an anionic hydrocolloid gum wherein the weight ratio of gelatin to anionic hydrocolloid gum is approximately 250–375:1. Through the use of such a setting system, lower gelatin use of up to 10% or more can be realized while achieving an increase in gel strength of up to about 20%.

10 Claims, No Drawings

GELATIN EXTENDER

BACKGROUND OF THE INVENTION

1. Technical Field

The present invention relates to gelatin desserts and a setting system to be used in the making thereof. More specifically, the setting system in accordance with the present invention comprises gelatin and an anionic hydrocolloid gum wherein the weight ratio of gelatin to gum is approximately 250–375:1. Through the use of a very small amount of anionic hydrocolloid gum in combination with the gelatin, the gel strength of the resulting gelatin product is significantly increased while allowing for about a 10% decrease in the required amount of gelatin. Additionally, the setting system set forth by the present invention provides an improved gelation time in comparison to conventional gelatin setting systems.

2. Prior Art

The production of gelatin represents a very large commercial market in the United States as well as in foreign jurisdictions. Only a few years ago, world gelatin production reached over 115,000 tons, with the United States food industry consuming close to 20,000 tons and having a projected annual growth rate of about 0.5%.

Gelatin, which is a degraded form of collagen, is the main protein gelling agent used in foods. This is due to the fact that gelatin can form gels over a wide range of concentrations, producing a wide range of possible products, such as jellies, mousses, marshmallows and fruit gums. Two main forms of gelatin exist. Gelatin type A and gelatin Type B are both obtained by the partial hydrolysis of collagen, the chief protein component in skin, bones, hides, and white connective tissues of the animal body. Type A is produced by acid processing of collagenous raw material and has an isoelectric point between a pH of 7 and 9. Type B is produced by alkaline or lime processing and has an isoelectric point between a pH of 4.8 and 5.2. Mixtures of Types A and B, as well as gelatins produced by modifications of the above-described processes may exhibit isoelectric points outside of the stated ranges. Most edible gelatin is Type A, but Type B is also used.

The largest use of edible gelatin in the food industry is in the preparation of gelatin desserts in which gelatin is conventionally found in concentrations of about 1.5 to 2.5%. The food industry takes advantage of gelatin's unique properties such as reversible gel-to-sol transition of aqueous solutions, viscosity of warm aqueous solutions, and capability to act as a protective colloid. Apart from being used in the making of gelatin desserts, gelatin is also used as a source of essential amino acids in dietary supplements and as therapeutic agents. For example, gelatin has been widely used in the treatment of muscular disorders and peptic ulcers, as well as an aid in infant feeding and for promoting nail growth.

Hydrocolloids are mainly responsible for the functional properties of processed food systems and the quality of many foods. Formulated foods usually contain mixtures of hydrocolloids performing structural functions. Hydrocolloids are defined as water soluble polymers with the ability to thicken or gel aqueous systems. The term "hydrocolloids" covers polysaccharides (i.e. gums), proteins and starches. Gelatin, discussed above, is a protein-based hydrocolloid, i.e. a polymer made up of amino acids.

D. V. Zasypkin, et al., *Food Hydrocoll.*, 10: 203 (1995) believe that investigations of hydrocolloid interactions in aqueous solutions and gels is necessary for improvement of conventional foods, the development of novel formulated foods and for controlling functional properties of food systems. Increasing attention has been given to the gelation of mixed aqueous solutions of proteins and polysaccharides. This trend reflects the key role of hydrocolloids in structure formation in foods, the increasing number of hydrocolloids used as food additives and the development of new processing methods such as microwave heating, thermoplastic extrusion and high-pressure treatment.

The amount of gelling agent used in food formulations can be reduced by using a mixture of gel forming agents. In addition, a mixture of gel forming agents can allow for a better control of the composition-structure-property relationship of many processed food systems and final food products. V. B. Toltoguzov in *Food Hydrocoll.* 9: 317 (1995) found that both synergistic and antagonistic effects of mixing biopolymers can occur. The synergistic effect of single-phase mixed solutions of biopolymers is due to the excluded volume effect of macromolecules. In a two-phase system, synergy results from the concentration of the continuous phase rich in stronger gelling agent. The synergistic and antagonistic effects resulting from blending biopolymers are of great importance for the improvement of many foods and also for reducing their cost. The main cause of synergistic effects seems to be thermodynamic incompatibility. The reason is that macromolecules cannot occupy the same volume in solution. This means that each biopolymer can only use some part of the volume of the mixed solution. In solutions, incompatible biopolymers mutually concentrate each other. Thus, each incompatible biopolymer will behave as if it were more concentrated. Since the shear modulus of a gel is usually proportional to the square of its concentration, this means that small additions of a hydrocolloid can increase the elastic modulus of a gel considerably. Excluded volume effects also favor gelation of hydrocolloids. For incompatible biopolymers in mixed solutions, the rate of gelation is higher and the critical concentration for gelation is lower than those for each of them individually. Excluded volume effects depends on the flexibility, shape and size of macromolecules as well as their bulk concentration. On the other hand, antagonistic effect results from the formation of soluble and insoluble complexes that cannot form an additional three-dimensional network. Filled, complex and mixed gels of gelatin with different polysaccharides have been used for the development of a caviar analogue (V. B. Toltoguzov, *Nahrung*, 23:649 (1979)), multicomponent gels have been used in non-traditional pasta products, meat or fish analogues (V. B. Toltoguzov, *Food Hydrocoll.*, 2: 339 (1988)), and in production of low fat spreads and fat replacers (D. V. Zasypkin, et al., *Food Hydrocoll.*, 10: 203 (1995)).

The essential structure of gelatin is a rod shape triple helix of three polypeptide chains. The main chains are very long (i.e. more than 1000 residues) and the molecular weight is more than 100,000 daltons. In vivo, gelatin's collagen helices are arranged in small groups or fibrils, which in turn are arranged in bundles. These structures are stabilized by covalent cross-links. During the production of gelatin, cross-links are broken and there may be extensive non-specific main-chain hydrolysis. As a result, gelatin is not a homogeneous product. Solid gelatin can be dissolved in hot water and it forms a gel upon cooling. When heated, the triple helices are largely unraveled and gelatin dissolves as random coils. When the solution is cooled, junction zones are formed by small segments from two or three polypeptide chains reverting to the collagen triple helix-like structure.

The total amount of helix formation in the system is very dependent on the rate of cooling, with very slow rates permitting the formation of a greater degree or ordered (helical) structure as compared to faster rates. Gelatin gels are also quite elastic. The rigidity modulus depends on the gelatin concentration, the weight average molecular weight and on the temperature. In gelatin gel matured at high temperatures, only a few collagen-like junctions form and the large remainder of each chain will be disordered so that weak gels are generated. On further cooling of this gel, additional parts of each polypeptide chain become ordered. However, it is not clear if the increase in gel strength results from the growth of the existing junctions or from the formation of new, but less stable, junctions. Nevertheless, observations suggest that a gel matured at a higher temperature, but below the nucleation temperature, prior to chilling to a lower temperature will be stronger, i.e. have greater rigidity than one chilled immediately to the lower temperature. The magnitude of this prematuring effect depends on pH and gelatin concentration, as well as temperature.

The processes of structure formation at different intra and intermolecular levels may be accelerated and intensified by adding polysaccharides. V. B. Toltoguzov et al., *Die Starke*, 26:130 (1974) have shown that the coil-helix transition for gelatin is markedly accelerated by the addition of a little dextran. At the same time, gelatin gelation proceeds faster. The gelation rate of gelatin has also been increased by the addition of some other polymers such as methylcellulose, starch hydrolysates and polyethyleneglycol (see W. M. Marrs, *Prog. Fd Nutr. Sc.*, 6:25 (1982)). The elastic modulus of filled gelatin gels increased with filler concentration in the single phase region but decreased in the two-phase region because of the increasing imperfection of the gel network.

U.S. Pat. No. 4,517,216 to Shim discloses blends of gellan gum and gelatin which exhibit a synergistic increase in gel strength. In the blends of Shim, the weight:weight ratio of gellan gum to gelatin ranges from 5:1 to 1:5.

U.S. Pat. No. 4,876,105 to Wolf et al. disclose gellan gum/gelatin blends which provide gels with improved setting and melting properties and improved room temperature stability relative to gels prepared using gelatin alone. Wolf et al. disclose a ratio of gellan to gelatin from 1:6 to 1:133, with a ratio of 1:20 to 1:50 being preferred. The gel ingredients also contained a combination of mono- and divalent ions. It is noted that Wolf et al. do not use gellan as an extender for gelatin but as a co-gelling agent. That is, the gellan is added to the existing level of gelatin used. Consequently, the relatively high level addition of gellan will reduce final or equilibrium gel strength if the total amount of gelling agent (i.e. gelatin and gellan) is fixed.

It would still be desirable to comprise a setting system for gelatin solution for use in making gelatin desserts that would not only mimic the texture of gelatin gel and provide increased gel strength and decreased gelation time, but also would allow for economic reasons a reduction in the required amount of gelatin.

SUMMARY OF THE INVENTION

The present invention is related to gelatin desserts, and more specifically to the use of anionic hydrocolloid gums as gelatin extenders therein. More particularly, the present invention is directed to a setting system for gelatin desserts comprising gelatin and an anionic hydrocolloid gum wherein the weight ratio of gelatin to anionic hydrocolloid gum is from about 250–375:1. It has surprisingly been found that by using very small amounts of a hydrocolloid gum as gelatin extenders, the resulting gelatin product has an increased gel strength of up to 20%, thereby simultaneously allowing for a lower usage of gelatin on the order of about 10%. Gelation time for the setting system of the present invention is also improved over that of the conventionally used setting system.

DETAILED DESCRIPTION OF THE PREFERRED EMBODIMENTS OF THE INVENTION

The present invention is directed to a setting system for a gelatin solution comprising gelatin and an anionic hydrocolloid gum wherein the weight ratio of gelatin to anionic hydrocolloid gum is from about 250–375:1.

It has surprisingly been found that the use of extremely low concentrations of anionic hydrocolloid gums as gelatin extenders provide a positive effect on gel strength of gelatin. Conventional knowledge indicates a negative effect to gel strength and clarity at normal concentrations. More specifically, it has been found that the use of anionic hydrocolloid gums as gelatin extenders has several advantages over the use of conventionally known gelatin extenders such as maltodextrin. To begin with, a lower use level of the anionic hydrocolloid gums in accordance with the present invention are required as compared to the conventional amounts of gelatin extenders known to those skilled in the art. Further, the anionic hydrocolloid gum gelatin extenders used in accordance with the present invention were found to be less sensitive to gelation/cooling rates, and therefore more suitable in the making of conventional gelatin dessert products. That is, not only does the setting system of the present invention allow for a significant decrease in the amount of gelatin required, i.e. a decrease of 10% or more required gelatin is possible, the resulting gelatin product possesses an increased gel strength of up to 20%. Additionally, gelation time of the setting system of the present invention is improved over that of the conventionally used setting system which uses gelatin extenders.

With the use of the setting system as set forth by the present invention, the required amount of gelatin in the gelatin dessert product can easily be reduced any where from 3–5 to 7–9% depending upon the particular anionic hydrocolloid gum being used. It has been found that this percentage reduction can be increased even further by increasing the pH of the gelatin solution. Also, higher percentage reductions reaching 10% or more can be obtained by using a longer, i.e. slower, gelation rate.

For purposes of the present invention, the gelatin solutions comprise from about 0.8 to about 2.0% gelatin, preferably from about 1.2 to about 1.7% gelatin, and most preferably about 1.5% gelatin. The gelatin solutions of the present invention are also characterized by having a pH of between about 3.8 to about 5.0.

The anionic hydrocolloid gums which are to be used in accordance with the present invention in combination with the gelatin are those hydrocolloid gums falling into the polysaccharide or "gum" category. Examples of anionic hydrocolloid gums which may be used in accordance with the present invention include, but are not limited to, xanthan gum, gellan gum, carageenan gum, ghatti gum, tragacanth gum, pectin, alginate, agar and mixtures thereof.

Of the multitude of hydrocolloid gums to choose from, it has further been found that the use of anionic hydrocolloids in the setting systems of the present invention provide superior results. Although neutral gums, such as guar gum, can provide positive results as indicated above, it has been found that the anionic hydrocolloid gums are preferred because of the surprisingly lower level of incorporation, with gellan and xanthan gums being most preferred from this category. As suggested by the two identified preferred gums, one will note that the use of a gelling polymer (such as gellan) as the anionic hydrocolloid is not mandatory. That is, a non-gelling gum such as xanthan gum has been found to work very well in the setting system of the present invention.

For a better understanding of the present invention, reference is made to the following examples, which are intended to be illustrative and not limiting.

EXAMPLE 1

To demonstrate the effectiveness of the present invention, gelatin solutions made in accordance with the present invention were prepared and compared to gelatin control solutions (commercially available refrigerated Jell-O brand gelatin desserts (JOG)) having no hydrocolloid added thereto. Variations in the gelatin's bloom and viscosity were made and the results compared with respect to gel strength. The gelatin solutions made in accordance with the present invention had a 9% gelatin reduction. Solutions were made having 0.005% gellan, as well as solutions having 0.002% xanthan as the added anionic hydrocolloid gum. Gel strength was tested at 40° F. after 4 hours of refrigeration and compared to the gelatin control solutions. Results are shown in the table below.

| Gelatin | | Gel Strength (gram force) @ 40° F. after 4 hrs refrigeration @ 9% Gelatin Reduction in JOG | | |
|---|---|---|---|---|
| Bloom | Viscosity (cps) | Full Gelatin Control | With 0.005% Gellan | With 0.002% Xanthan |
| 220 | 73 | 22.3 | 16.6 | 16.3 |
| 220 | 33 | 16.6 | 18.8 | 19.8 |
| 245 | 37 | 20.8 | 20.9 | 21.9 |
| 260 | 35 | 20.9 | 22.5 | — |
| 290 | 72 | 31.4 | 29.2 | 26.4 |

A review of the results shown in the above table indicate that both gellan and xanthan work best in gelatins of low viscosity/molecular weight. The effect was less pronounced with gelatins of high viscosity regardless of bloom. As will be shown in the following examples, the 0.005% gellan and the 0.002% xanthan used above proved to be the optimum concentrations of these gums, respectively, for use in the setting system of the present invention. Not only were gel strengths boosted by up to 20%, thus allowing for the lower usage of gelatin, gelation rate was also found to be increased.

EXAMPLE 2

The procedure of Example 1 was repeated except for (1) instead of varying gelatin, gellan concentration and pH were varied and (2) gelatin content was held constant at 1.5%. The results shown in Table 2 reveal that an optimum gum concentration exist for each type of anionic gum used. For gellan gum, such optimum appears to be about 0.005% by weight across a pH range of 3.50 to 4.40. The same data also indicate that the textural effect of gellan is additive to the well known pH effect on the firmness of gelatin desserts (U.S. Pat. No. 5,348,756 to Lee et al.). Thus, texture firming effect of anionic gum and increased pH can be used together in gelatin-based desserts.

| Gel Strength as Texture Analyzer Reading in grams | | | | | |
|---|---|---|---|---|---|
| | % Gellan | | | | |
| pH | 0 (Control) | 0.0025 | 0.0050 | 0.0075 | 0.0100 |
| 4.18 | 25.0 | 26.1 | 27.2 | 26.5 | 25.1 |
| 3.95 | 23.9 | 25.5 | 26.3 | 25.8 | 24.3 |
| 3.73 | 22.8 | 24.5 | 25.2 | 24.7 | 23.1 |

While the present invention has been particularly shown and described with respect to preferred embodiments thereof, it will be understood by those skilled in the art that the foregoing and other changes in form and details may be made therein without departing from the spirit and scope of the invention. The present invention is not restricted to the particulars constructions described and illustrated, but should be constructed to cohere with all modifications that may fall within the scope of the appended claims.

What is claimed is:

1. A setting system for a gelatin solution comprising gelatin and an anionic hydrocolloid gum wherein the weight ratio of gelatin to hydrocolloid gum is from about 250:1 to about 375:1.

2. The setting system according to claim 1 wherein the anionic hydrocolloid gum is selected from the group consisting of xanthan gum, gellan gum, carageenan gum, ghatti gum, tragacanth gum, pectin, alginate, agar and mixtures thereof.

3. The setting system according to claim 2 wherein the anionic hydrocolloid gum is a gelling gum.

4. The setting system according to claim 3 wherein the gelling gum is gellan.

5. The setting system according to claim 2 wherein the anionic hydrocolloid is a non-gelling gum.

6. The setting system according to claim 5 wherein the non-gelling gum is xanthan.

7. The setting system according to claim 1 wherein the gelatin solution comprises from about 0.8 to about 2.0% gelatin.

8. The setting system according to claim 7 wherein the gelatin solution comprises from about 1.2% to about 1.7% gelatin.

9. The setting system according to claim 8 wherein the gelatin solution comprises about 1.5% gelatin.

10. The setting system according to claim 1 wherein the gelatin solution has a pH of from about 3.8 to 5.0.

* * * * *